US012565958B2

(12) United States Patent
Millet et al.

(10) Patent No.: US 12,565,958 B2
(45) Date of Patent: Mar. 3, 2026

(54) SLEEVE FASTENING SYSTEM

(71) Applicant: Airbus Operations (S.A.S.), Toulouse (FR)

(72) Inventors: Gérard Millet, Toulouse (FR); Vincent Delpy, Toulouse (FR); Simon Foucart-Gaudy, Toulouse (FR); Marc-Antoine Brocard, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 246 days.

(21) Appl. No.: 18/538,069

(22) Filed: Dec. 13, 2023

(65) Prior Publication Data

US 2024/0200707 A1     Jun. 20, 2024

(30) Foreign Application Priority Data

Dec. 16, 2022     (FR) ...................................... 2213534

(51) Int. Cl.
*F16L 41/08*          (2006.01)
(52) U.S. Cl.
CPC .................................... *F16L 41/08* (2013.01)
(58) Field of Classification Search
CPC ..... F16L 5/027; F16L 5/04; F16L 5/06; F16L 5/10; F16L 5/00; F16L 41/08
See application file for complete search history.

(56) References Cited

U.S. PATENT DOCUMENTS

| | | | | | |
|---|---|---|---|---|---|
| 1,890,006 | A | * | 12/1932 | Swift | G01K 1/14 |
| | | | | | 374/208 |
| 3,275,347 | A | * | 9/1966 | William | F16L 19/10 |
| | | | | | 403/194 |
| 4,225,162 | A | * | 9/1980 | Dola | F16L 33/26 |
| | | | | | 285/251 |
| 2011/0309611 | A1 | * | 12/2011 | Smith | H02G 3/065 |
| | | | | | 285/139.3 |
| 2015/0010372 | A1 | | 1/2015 | Herrema | |
| 2019/0178432 | A1 | * | 6/2019 | Van Den Berg | F16L 55/17 |
| 2021/0270392 | A1 | | 9/2021 | Popov | |

FOREIGN PATENT DOCUMENTS

| | | | | |
|---|---|---|---|---|
| EP | 1609637 A1 | 12/2005 | | |
| WO | WO-03093719 A1 | * | 11/2003 | F16L 5/10 |
| WO | WO-2015060388 A1 | * | 4/2015 | F16L 59/121 |
| WO | WO-2015060389 A1 | * | 4/2015 | F16L 57/04 |

OTHER PUBLICATIONS

French Search Report for Application No. 2213534 dated Jun. 21, 2023.

* cited by examiner

*Primary Examiner* — Zachary T Dragicevich
*Assistant Examiner* — James A Linford
(74) *Attorney, Agent, or Firm* — KDW Firm PLLC

(57)          ABSTRACT

A sleeve fastening system fastened to a joist pierced with a hole and receiving two pipes and including a cylinder fitted into the hole of which each end receives a pipe, wherein the wall of the cylinder has cut into it at least one tunnel, a flange, each tunnel having openings that emerge on either side of the flange that has a bearing face bearing against the joist and a free face, and for each tunnel, a holding system having a link, a shoe and a locking system, the link being housed in the tunnel with the shoe blocked in a first opening on the side of the free face and wherein the link exits via a second opening on the side of the bearing face and wherein the locking system attaches.

6 Claims, 5 Drawing Sheets

FIG. 5

SLEEVE FASTENING SYSTEM

TECHNICAL FIELD

The disclosure herein relates to a sleeve fastening system that makes it possible to fasten pipes through a support such as a joist, and an assembly having a joist, pipes and such a sleeve fastening system.

BACKGROUND

There are numerous means for fastening pipes. For example, in an aircraft, there are horizontal joists and the pipes, in particular the conditioned-air pipes, are fastened to the joists either above or below them.

As a result of the positioning of the pipes, the space above and below the joists is cluttered, and this reduces the habitability of the aircraft.

Furthermore, in order to fasten the pipes, it is often necessary to realize piercings in the joists so as to fasten thereto fittings to which the pipes are attached.

It is therefore necessary to find an arrangement that makes it possible to limit the cluttering with the pipes and that avoids having to pierce the joists.

SUMMARY

An object of the disclosure herein is a sleeve fastening system that is arranged to be fastened inside a hole passing through a joist.

To that end, a sleeve fastening system is disclosed to be fastened to a joist pierced with a hole and to receive two pipes, the sleeve fastening system having:

- a cylinder of which each end is intended to receive a pipe by fitting, wherein the wall of the cylinder has cut into it at least one tunnel that is sealed with respect to the inside of the cylinder, wherein the cylinder is intended to be fitted into a hole in the joist,
- a flange as one with the cylinder and extending around the cylinder, wherein each tunnel has a first and a second openings that emerge outside the wall of the cylinder and on either side of the flange, wherein the flange has a bearing face intended to bear against the joist and a free face opposite, and
- for each tunnel, a holding system having a link, a shoe as one with a first end of the link and a locking system, wherein the link is housed in the tunnel such that the shoe is blocked at the first opening that is on the side of the free face and such that the second end of the link exits via the second opening on the side of the bearing face and wherein the locking system has a connector that attaches to the second end of the link and a bearing surface intended to come to bear against the joist.

With such an arrangement, the pipes pass through the joist at a hole that is already present.

Advantageously, the cylinder bears a bypass pipe that is arranged on the side of the first opening with respect to the flange and that emerges inside the cylinder.

Advantageously, the link takes the form of a self-locking clamping collar with teeth, and the connector has a non-return ratchet that cooperates with the teeth so as to block the withdrawal of the link.

Advantageously, the ratchet is mounted on an elastic arm of the connector.

Advantageously, the holding system has a support that extends the bearing surface towards the flange and is intended to penetrate into the hole, passing between the roof of the tunnel and the surface of the hole.

The disclosure herein also proposes an assembly having:
- a joist passed through by a hole,
- two pipes, and
- a sleeve fastening system according to one of the preceding variants wherein the cylinder is fitted into the hole and the bearing face of the flange bears against the joist, wherein the bearing surface is against the joist, and wherein a pipe is fitted onto each end of the cylinder.

BRIEF DESCRIPTION OF THE DRAWINGS

The abovementioned features of the disclosure herein, along with others, will become more clearly apparent upon reading the following description of one example embodiment, the description being given with reference to the appended drawings, in which:

FIG. 5 shows a view in cross section along the line V-V in FIG. 4; and

DETAILED DESCRIPTION

Figure 1:
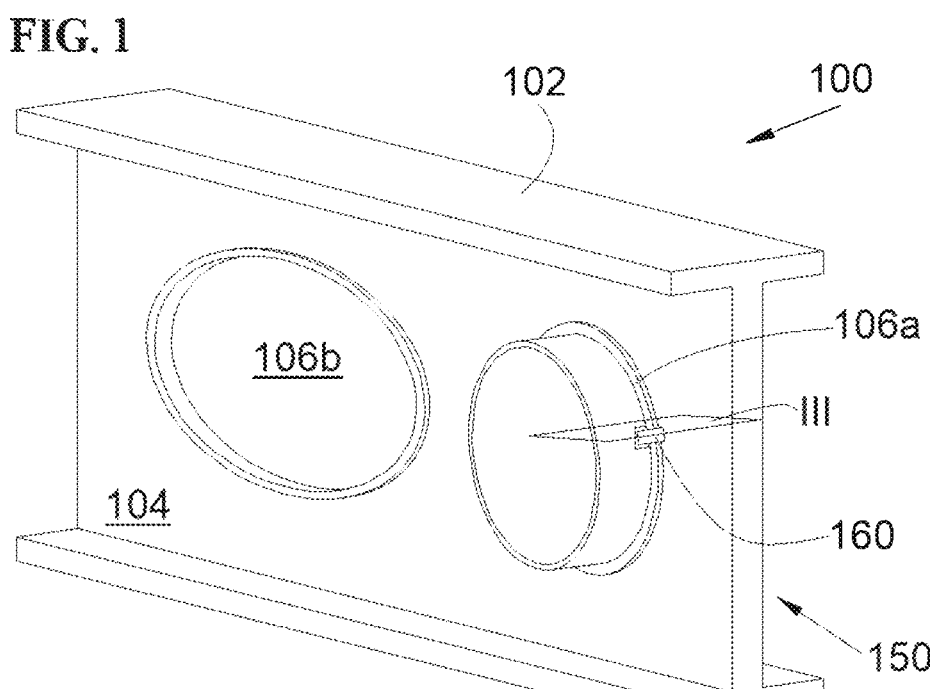
FIG. 1 shows a perspective view of an assembly according to a first embodiment of the disclosure herein.

FIG. 1 shows an assembly 100 that has a joist 102, in this case a beam of IPE type, but any other type of joist is conceivable.

The joist 102 has a web 104 that is passed through by at least one hole 106a-b. In this case, there is a hole 106a of circular shape and a hole 106b of elliptical shape, but any shape of hole is possible.

Figure 2:
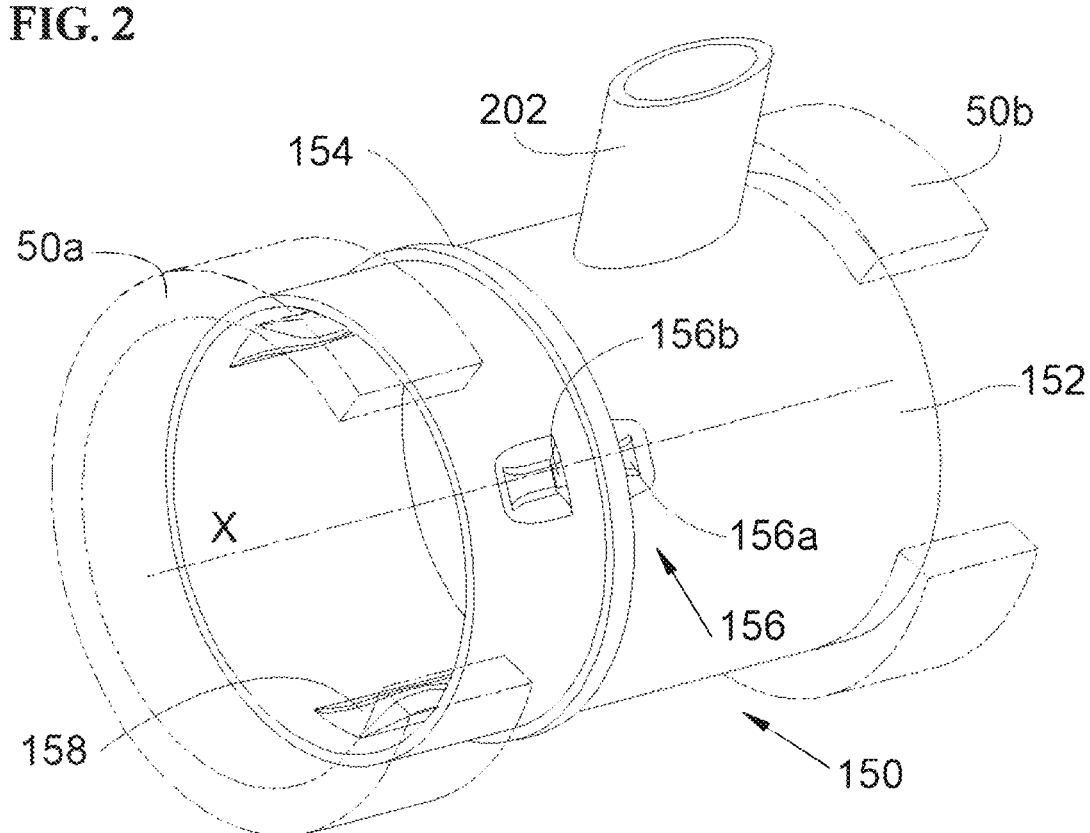
FIG. 2 shows a perspective view of a sleeve fastening system according to the disclosure herein.

The assembly 100 also has a sleeve fastening system 150 of which one embodiment is depicted in FIG. 2 and which is fastened to the joist 102 and receives two pipes 50a-b of the assembly 100 that are depicted in partial cross section and in chain line in FIG. 2.

The sleeve fastening system 150 is constituted of a flange 154 and a cylinder 152 having an axis X. The flange 154 is as one with the wall of the cylinder 152 and extends coaxially around the wall of the cylinder 152 so as to form an outer peripheral rib. The flange 154 is at a distance from each end of the cylinder 152 so as to allow the fitting of a pipe 50a-b onto each of the ends, i.e. on either side of the flange 154.

The wall of the cylinder 152 has cut into it at least one tunnel 156 that has a first and a second openings 156a-b that emerge outside the wall of the cylinder 152 and on either side of the flange 154. In the embodiment of the disclosure herein that is presented here, there are three tunnels 156 so as to ensure better holding of the sleeve fastening system 150 on the web 104. Each tunnel 156 extends parallel to the axis X.

In the case of the transport of fluid inside the cylinder 152, each tunnel 156 is sealed with respect to the inside of the cylinder 152. If the thickness of the wall of the cylinder 152 is sufficient, each tunnel 156 is cut into the wall of the cylinder 152 and if the thickness is insufficient, a reinforcement 158 is provided inside the wall of the cylinder 152 in order to delimit each tunnel 156 in a sealed manner. The wall of the cylinder 152, each reinforcement 158 and the associated tunnel 156 are realized conventionally by molding a plastic material.

For each tunnel 156, the sleeve fastening system 150 has a holding system 160, 260 of which various embodiments are described below and which ensures the fastening of the cylinder 152 on the joist 102.

When the sleeve fastening system 150 is put in place, an end of the cylinder 152 is fitted into a hole 106a-b in the web 104 of the joist 102 so as to bring the flange 154 against the edge of the hole 106a-b and against the web 104. The diameter of the flange 154 is greater than the inner dimension of the hole 106a-b so as to be able to abut the joist 102. The flange 154 thus has a bearing face 154a (FIGS. 3 and 4) that bears against the joist 102 and a free face 154b opposite.

Figure 3:
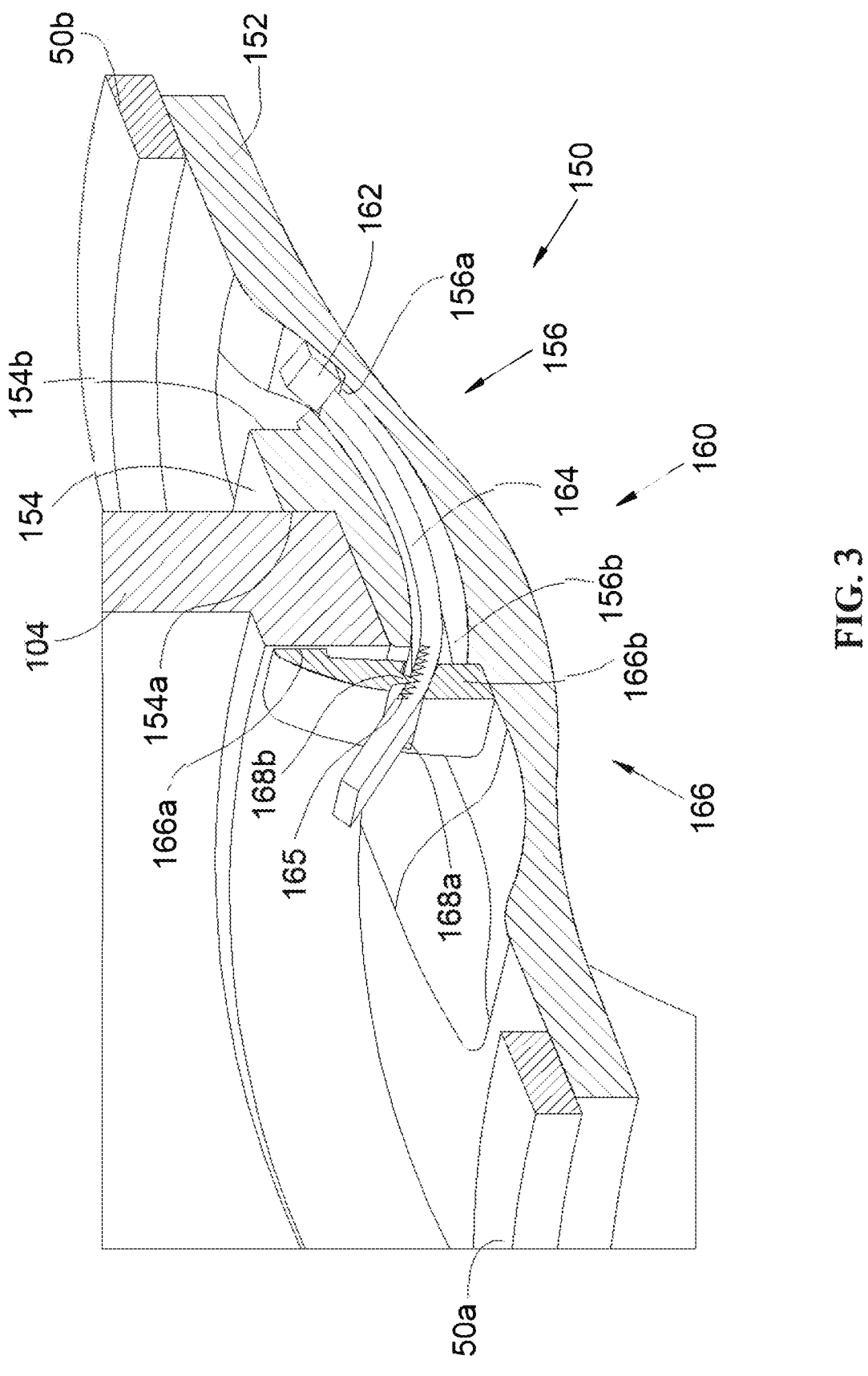
FIG. 3 shows a perspective view in cross section of the assembly in FIG. 1 on the plane III in FIG. 1.
Figure 4:
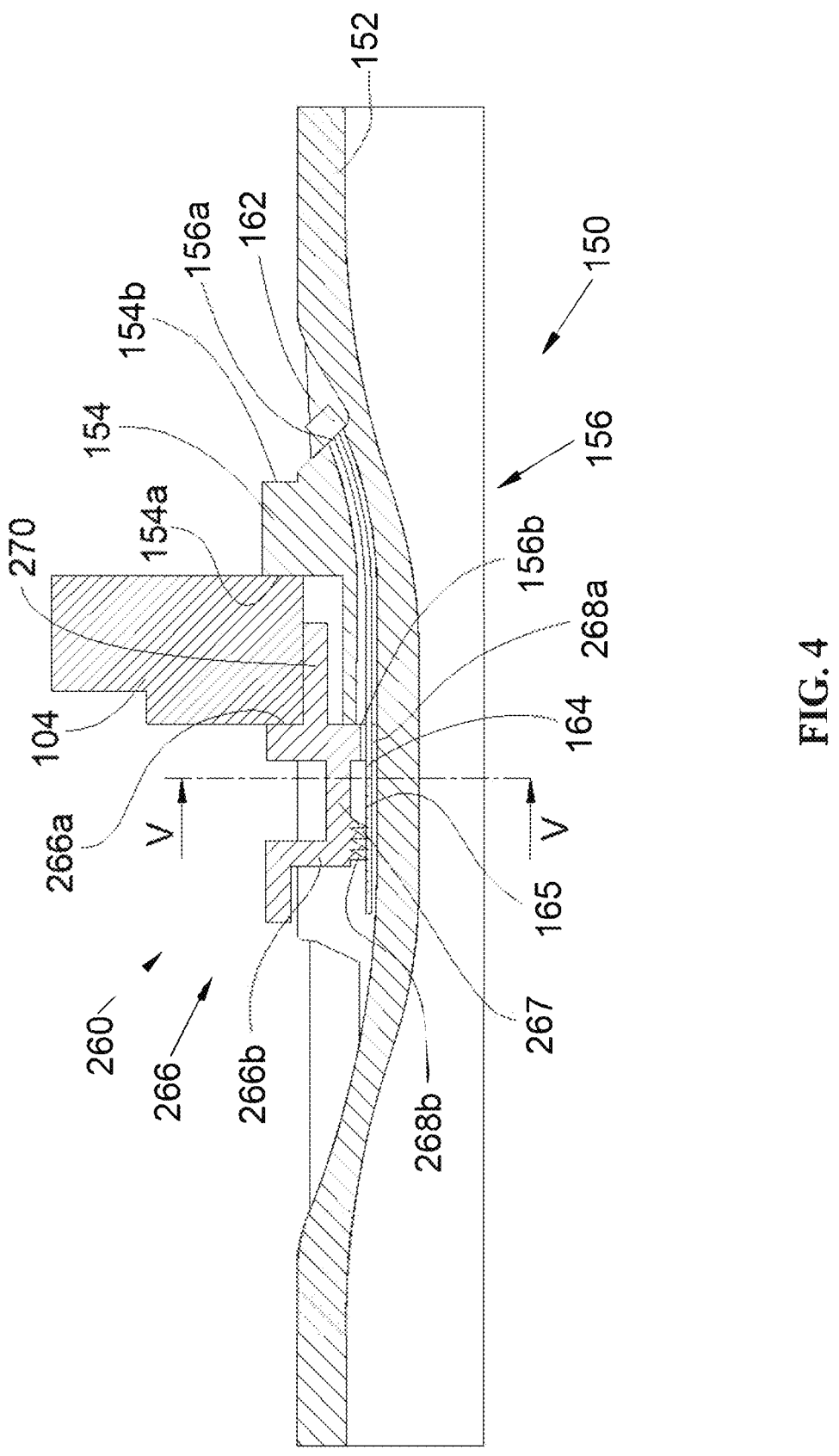
FIG. 4 shows a view in cross section of an assembly according to a second embodiment of the disclosure herein.
Figure 5:
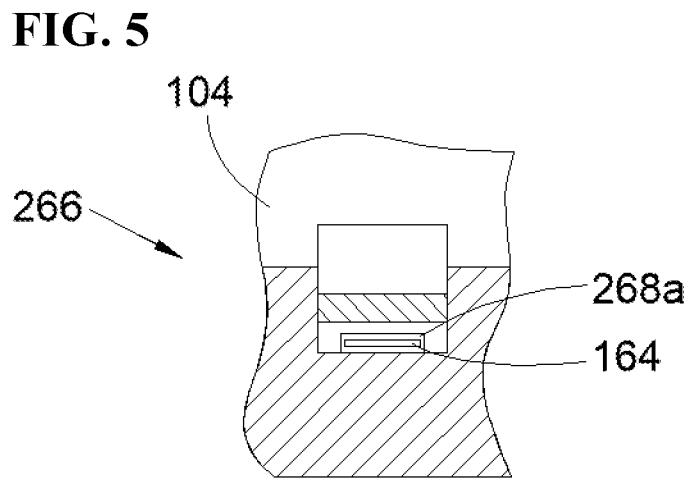

As is depicted in FIGS. 3 to 5, the holding system 160, 260 has a link 164 and a shoe 162 as one with a first end of the link 164. The link 164 is housed in the tunnel 156 and has a second end that is opposite the shoe 162 and that is introduced into the tunnel 156 via the first opening 156a that is on the side of the free face 154b of the flange 154 so as to emerge via the second opening 156b on the side of the bearing face 154a. The dimensions of the shoe 162 and of the tunnel 156 are such that the shoe 162 cannot pass through the tunnel 156 and the shoe 162 is thus blocked at the first opening 156a. The link 164 is preferably flexible so as to make the passage through the tunnel 156 easier and its second end exits via the second opening 156b.

The holding system 160, 260 has a locking system 166, 266 that has a bearing surface 166a, 266a that, in use, bears against the web 104 of the joist 102 opposite the bearing face 154a with respect to the joist 102, and a connector 166b, 266b that attaches to the second end of the link 164 so as to block the link 164 in the tunnel 156 and thus prevent the withdrawal of the link 164 while at the same time ensuring the clamping of the bearing surface 166a, 266a against the web 104.

During the putting in place, the second end of the link 164 is pulled so as to block the shoe 162 at the first opening 156a in the tunnel 156, then the locking system 166, 266 is moved along the link 164 from its second end towards its first end so as to bring the bearing surface 166a, 266a against the joist 102 and thus clamp the joist 102 between the bearing face 154a of the flange 154 and the bearing surface 166a, 266a of the locking system 166, 266. At the same time, the connector 166b, 266b attaches to the second end of the link 164 so as to block the shoe 162 and the bearing surface 166a, 266a.

Each pipe 50a-b is fitted in a sealed manner onto an end of the cylinder 152. The sealing is realized by any appropriate structure, such as for example the putting in place and clamping of a circular clamp around the pipe 50a-b, in particular in the case of a flexible pipe 50a-b, but the sealing may also be realized by adhesive bonding, or putting in place a seal between the cylinder 152 and the pipe 50a-b.

Thus, the sleeve fastening system 150 is housed in a hole 106a-b in the joist 102 and no longer encroaches on the space available above or below the joist 102.

In the embodiment of the disclosure herein that is presented in FIG. 2, the cylinder 152 has a bypass pipe 202 that is arranged on the side of the first opening 156a with respect to the flange 154, i.e. on the side opposite the bearing face 154a, and that emerges inside the cylinder 152 and makes it possible to fluidically connect a bypass pipe.

FIG. 3 shows an embodiment of the holding system 160. In this embodiment, the link 164 takes the form of a self-locking clamping collar of the "Ty-Rap®" type, for example. That is to say that the link 164 has teeth 165 and the connector 166b has a slot 168a in which the link 164 is inserted and, inside the slot 168a, the connector 166b has a non-return ratchet 168b that cooperates with the teeth 165 so as to block the withdrawal of the link 164 as soon as a tooth 165 of the link 164 is engaged with the ratchet 168b. The link 164 is thus sandwiched between one of the faces of the slot 168a and the ratchet 168b.

According to one embodiment, the connector 166b has a disengagement system that makes it possible to disengage the ratchet 168b so as to make it possible to withdraw the link 164. Such a disengagement system is constituted for example of an elastic arm on which the ratchet 168b is mounted and the tilting of the arm then makes it possible to move the ratchet 168b away from the teeth 165 of the link 164.

FIG. 4 and FIG. 5 show another embodiment of the holding system 260. In this embodiment, the link 164 also takes the form of a self-locking clamping collar with its teeth 165 and the connector 266b has a passage 268a beneath which the link 164 passes between the roof of the passage 268a and the wall of the cylinder 152. At the outlet of the passage 268a, the connector 266b has a non-return ratchet 268b that cooperates with the teeth 165 so as to block the withdrawal of the link 164 as soon as a tooth 165 of the link 164 is engaged with the ratchet 268b. The link 164 is thus sandwiched between the wall of the cylinder 152 and the ratchet 268b.

In this embodiment, the connector 266b has a disengagement system that makes it possible to disengage the ratchet 268b so as to make it possible to remove the link 164. Such a disengagement system is constituted in this case of an elastic arm 267 of the connector 266b on which the ratchet 268b is mounted and the tilting of the arm 267 then makes it possible to move the ratchet 268b away from the teeth 165 of the link 164.

In the embodiments that are presented in FIG. 3, the diameter of the hole 106a-b in the web 104 is equal to the diameter of the roof of the tunnel 156, and this ensures correct positioning of the cylinder 152, but the diameter of the hole 106a-b may be greater as is depicted in FIG. 4.

In this embodiment, the holding system 260 then has a support 270 that extends the bearing surface 266a towards the flange 154 and penetrates into the hole 106a-b in the web 104, passing between the roof of the tunnel 156 and the surface of the hole 106a-b. The roof of the tunnel 156 is the part that delimits the tunnel 156 and that is oriented towards the outside of the cylinder 152.

The sleeve fastening system 150 may be preassembled before its use by introducing the link 164 into the tunnel 156 and by putting in place the holding system 160, 260 on the link 164 in a non-clamped position. The sleeve fastening system 150 may then be put in place in the hole 106a-b in the joist 102 and the holding system 160, 260 is actuated so as to ensure the clamping.

Figure 6:
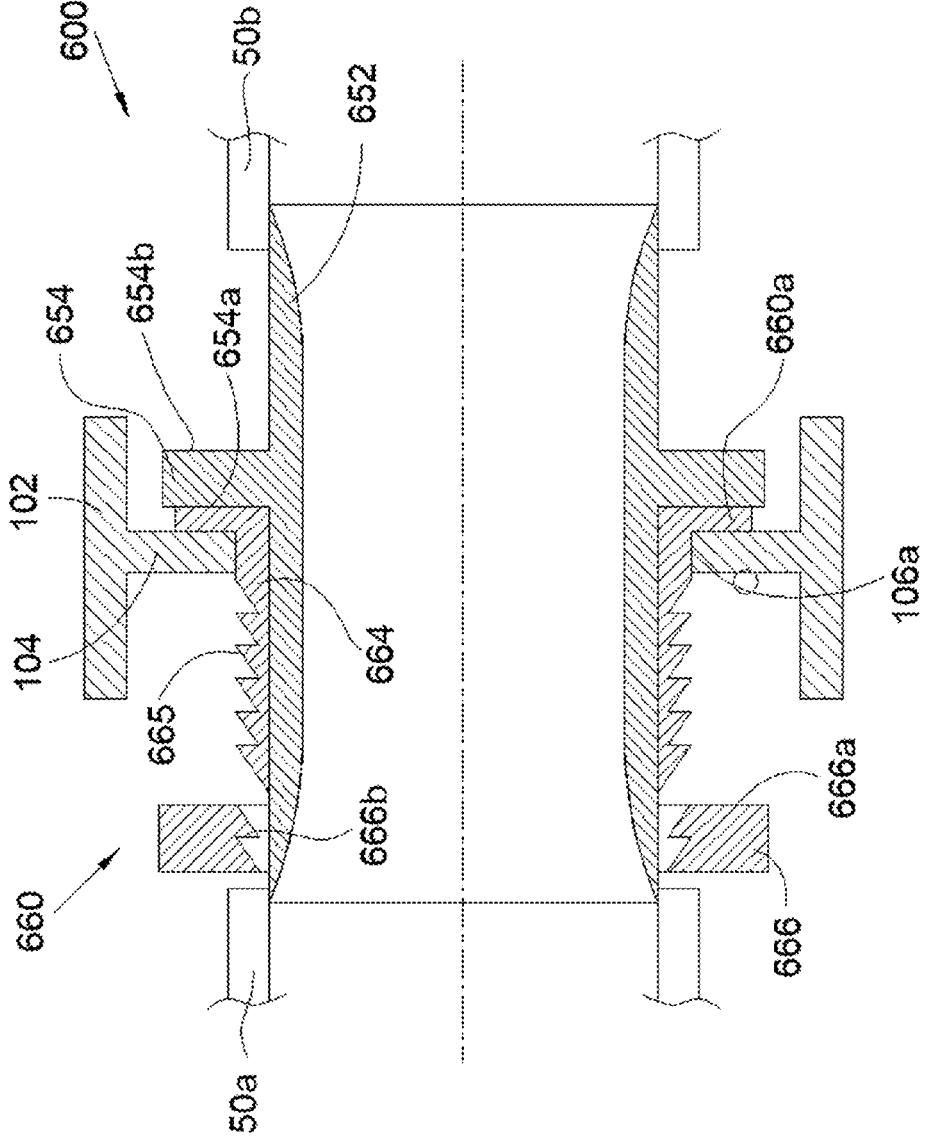
FIG. 6 shows a view in cross section of an assembly according to another embodiment.

FIG. 6 shows a sleeve fastening system 600 that is fastened to a joist 102 of which the web 104 is pierced with a hole 106a and which receives two pipes 50a-b. The sleeve fastening system 600 has a cylinder 652 of which each end receives a pipe 50a-b by fitting and the cylinder 652 is fitted into the hole 106a in the joist 102.

The sleeve fastening system 600 also has a flange 654 as one with the cylinder 652 and extending around the latter, wherein the flange 654 has a bearing face 654a that faces the joist 102 and a free face 654b opposite.

The sleeve fastening system 600 also has a holding system 660 having a washer 660*a*, in particular a flexible washer such as a Belleville washer, which is fitted onto the cylinder 652 and positioned between the bearing face 654*a* and the joist 102.

The sleeve fastening system 600 also has a plurality of links 664, wherein each one has a first end as one with the washer 660*a* and a second, free end opposite the washer 660*a*, wherein each link 664 takes the form of a self-locking clamping collar with teeth 665. Each link 664 extends on the outside along the wall of the cylinder 652. Each link 664 passes through the hole 106*a*.

The sleeve fastening system 600 also has a locking system 666 having a connector 666*b* that attaches to the teeth 665 from the second end of the link 664 and a bearing surface 666*a* that comes to bear against the joist 102 on the other side with respect to the washer 660*a*. The connector 666*b* in this case takes the form of a ratchet that cooperates with the teeth 665.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sleeve fastening system for fastening to a joist pierced with a hole and to receive two pipes, the sleeve fastening system comprising:
    a cylinder of which each end is configured to receive a pipe by fitting, wherein a wall of the cylinder has cut into the wall at least one tunnel that is sealed with respect to an inside of the cylinder, wherein the cylinder is configured to be fitted into a hole in the joist;
    a flange as one with the cylinder and extending around the cylinder, wherein each tunnel has a first and second openings that emerge outside the wall of the cylinder and on either side of the flange, wherein the flange has a bearing face to bear against the joist and a free face opposite; and
    for each tunnel, a holding system having a link, a shoe as one with a first end of the link and a locking system, wherein the link is housed in the tunnel such that the shoe is blocked at the first opening that is on a side of the free face and such that the second end of the link exits via the second opening on a side of the bearing face and wherein the locking system has a connector that attaches to the second end of the link and a bearing surface to come to bear against the joist.

2. The sleeve fastening system according to claim 1, wherein the cylinder bears a bypass pipe that is on a side of the first opening with respect to the flange and that emerges inside the cylinder.

3. The sleeve fastening system according to claim 1, wherein the link comprises a self-locking clamping collar with teeth and wherein the connector has a non-return ratchet that cooperates with the teeth to block withdrawal of the link.

4. The sleeve fastening system according to claim 3, wherein the ratchet is mounted on an elastic arm of the connector.

5. The sleeve fastening system according to claim 1, wherein the holding system has a support that extends the bearing surface towards the flange and is configured to penetrate into the hole, passing between a roof of the tunnel and a surface of the hole.

6. An assembly comprising:
    a joist passed through by a hole;
    two pipes; and
    a sleeve fastening system according to claim 1 wherein the cylinder is fitted into the hole and the bearing face of the flange bears against the joist, wherein the bearing surface is against the joist, and wherein a pipe is fitted onto each end of the cylinder.

* * * * *